United States Patent
Cahill et al.

(10) Patent No.: US 11,310,362 B2
(45) Date of Patent: Apr. 19, 2022

(54) VOICE CALL DIVERSION TO ALTERNATE COMMUNICATION METHOD

(71) Applicant: Webtext Holdings Limited, Dublin (IE)

(72) Inventors: Anthony Cahill, County Galway (IE); Colm Keating, Dublin (IE)

(73) Assignee: WEBTEXT HOLDINGS LIMITED, Dublin (IE)

( * ) Notice: Subject to any disclaimer, the term of this patent is extended or adjusted under 35 U.S.C. 154(b) by 0 days.

(21) Appl. No.: 14/696,444

(22) Filed: Apr. 26, 2015

(65) Prior Publication Data
US 2015/0312416 A1    Oct. 29, 2015

Related U.S. Application Data

(60) Provisional application No. 61/984,813, filed on Apr. 27, 2014.

(51) Int. Cl.
*H04M 3/51*    (2006.01)

(52) U.S. Cl.
CPC ................................ *H04M 3/5166* (2013.01)

(58) Field of Classification Search
CPC .. H04M 3/5175; H04M 3/523; H04M 3/5232; H04M 3/5233; H04M 3/5183; H04M 3/5166; H04M 3/5191; H04M 3/54; H04M 3/436
USPC ............... 379/265.01–265.2, 211.01, 265.11, 379/266.01, 265.01–265.2
See application file for complete search history.

(56) References Cited

U.S. PATENT DOCUMENTS

| | | | | |
|---|---|---|---|---|
| 5,311,583 | A | * 5/1994 | Friedes | H04M 3/4228 379/207.03 |
| 6,178,240 | B1 | * 1/2001 | Walker | H04M 3/428 379/265.01 |
| RE45,926 | E | * 3/2016 | Luehrig | G06Q 30/0258 |
| 2007/0003050 | A1 | * 1/2007 | Ebling | H04M 3/523 379/265.02 |
| 2007/0142041 | A1 | 6/2007 | Wood | |
| 2011/0051918 | A1 | * 3/2011 | Fan | H04M 3/5166 379/211.02 |
| 2014/0201278 | A1 | * 7/2014 | Yuan | H04L 65/403 709/204 |
| 2014/0334614 | A1 | * 11/2014 | Mezhibovsky | H04M 3/4936 379/88.01 |

FOREIGN PATENT DOCUMENTS

EP    2346234 A1    7/2011

OTHER PUBLICATIONS

International Search Report and Written Opinion received for International Patent Application No. PCT/IB2015/053030, dated Jul. 30, 2015, 8 pages.

\* cited by examiner

*Primary Examiner* — Rasha S Al Aubaidi
(74) *Attorney, Agent, or Firm* — Pearne & Gordon LLP

(57) ABSTRACT

A method of voice call diversion includes detecting an incoming voice call communication from a calling device, identifying an alternate communication option, providing the alternate communication option to the calling device, detecting a selection of the alternate communication option from the calling device, and diverting the incoming voice call communication so as to utilize the selected alternate communication option.

40 Claims, 4 Drawing Sheets

VOICE CALL DIVERSION TO ALTERNATE COMMUNICATION METHOD

FIELD

The presently disclosed embodiments relate to messaging and communications, including providing improved communication between a caller and a contact center.

BACKGROUND

Voice callers to businesses and contact centers may be held on queue if an agent is not available to answer their call. The caller may be given options that include, for example, staying in the queue, receiving a call back, leaving a message or ending the call. There is presently no solution for the caller to engage in any form of dialogue with an agent immediately. Because of the nature of 1 to 1 voice conversation; a caller must wait in queue for an agent to become available or to receive a call back before the caller and the agent may communicate exclusively with each other. The currently available solutions do not allow for multiple callers to engage with a single agent.

SUMMARY

According to the disclosed embodiments, when an agent is not immediately available to take a voice call in a communication system, for example, an Interactive Voice Response (IVR) system, the caller may be placed in queue and offered the option to be diverted to communicate with an agent via an alternate mechanism, for example, text messaging. If the caller accepts the offer, the caller may be sent a message using the alternate mechanism, for example, a text message, to initiate a conversation using the alternate mechanism and the voice call may be ended. The caller may then respond to the alternate mechanism message and enter into a dialogue with an agent. The disclosed embodiments thus provide for call diversion, that is, diverting a call to an alternate messaging channel or mechanism for more immediate attention.

A caller may use a device to initiate a voice call to a contact center, where a voice system answers and places the caller in queue. The voice system may then offer the caller the option to communicate by an alternate method, for example, text messaging, via a voice prompt and request an acceptance by voice, a key press on the caller's device, or other indication of acceptance. The contact center voice system may detect the acceptance and the caller's device may be diverted to an alternate communication method, where a message may be sent to the caller's device. The voice system may then end the voice call and the caller may use the caller's device to reply using the alternate method and may present a query or otherwise communicate information. The reply and further communications may be sent to the contact center for immediate action by an agent.

In at least one embodiment, a method of voice call diversion includes detecting an incoming voice call communication from a calling device, identifying an alternate communication option, providing the alternate communication option to the calling device, detecting a selection of the alternate communication option from the calling device, and diverting the incoming voice call communication so as to utilize the selected alternate communication option.

According to the disclosed embodiments, detecting the incoming voice call communication includes placing the incoming voice call communication in a queue.

Also according to the disclosed embodiments, identifying the alternate communication option includes identifying one or more non-voice communication options.

Further according to the disclosed embodiments, providing the alternate communication option to the calling device includes sending a notification to the calling device of the one or more non-voice communication options.

Still further according to the disclosed embodiments, detecting a selection of the alternate communication option includes detecting a selection from the one or more non-voice communication options.

In addition, according to the disclosed embodiments, diverting the incoming voice call so as to utilize the selected alternate communication option includes converting a communication format of the incoming voice call communication to a format of the selected alternate communication option.

In further embodiments, the alternate communication option is a text message communication option.

Some embodiments may include a computer program product including non-transitory computer program instructions that when executed by a processor cause the processor to perform the techniques and methods disclosed herein.

In one or more embodiments, a system for voice call diversion includes a communication system for detecting an incoming voice call communication from a calling device, and a call diversion module configured to identify an alternate communication option, provide the alternate communication option to the calling device, detect a selection of the alternate communication option, and divert the incoming voice call communication so as to utilize the selected alternate communication option.

According to the disclosed embodiments, upon detecting the incoming voice call communication, the system is configured to place the incoming voice call communication in a queue.

Also according to the disclosed embodiments, the call diversion module is configured to identify one or more alternate non-voice communication options.

Further according to the disclosed embodiments, the call diversion module is configured to provide the alternate communication option to the calling device by sending a notification to the calling device of the one or more non-voice communication options.

Still further according to the disclosed embodiments, the call diversion module is configured to detect a selection from the one or more alternate non-voice communication options.

In addition, according to the disclosed embodiments, the communication diversion module is configured to divert the incoming voice call so as to utilize the selected alternate communication option by converting a communication format of the incoming voice call communication to a format of the selected alternate communication option.

In further embodiments, the alternate communication option is a text message communication option.

BRIEF DESCRIPTION OF THE DRAWINGS

Further aspects, details, advantages and modifications of the disclosed embodiments will become apparent from the following detailed description which is to be taken in conjunction with the accompanying drawings, in which.

DETAILED DESCRIPTION

Figure 1:
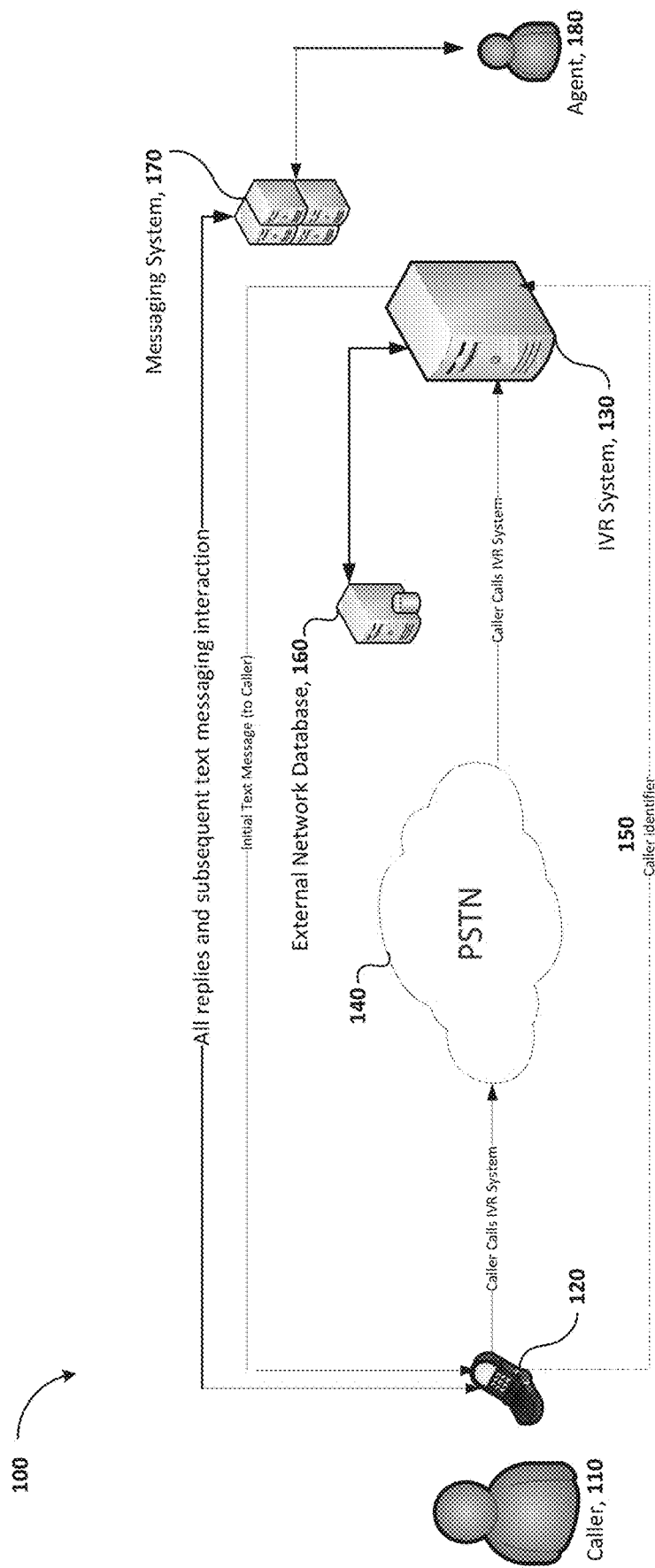
FIG. 1 shows an illustration of an exemplary process for voice call diversion according to the disclosed embodiments.

In illustration, FIG. 1 pictorially depicts an exemplary process 100 for call diversion handling in a communication system, for example, a contact center with an IVR data processing system. As shown in FIG. 1, a caller 110 using a calling device 120 that is enabled for both voice calling and an alternate communication method can establish a telephone call with a communication system 130 over the Public Switched Telephone Network (PSTN) 140 or other suitable network. The communication system 130 may provide the calling device 120 with a prompt offering an option to divert from a voice call to an alternate communication method, for example, non-voice communication, non-synchronous communication, email, chat, or any suitable alternate communication method. This example utilizes text messaging. The caller 110 indicates acceptance of the offer to the communication system 130 by use of a key press, dual tone multi-frequency (DTMF) signaling, speech, or some other indication on the calling device 120. A caller or calling device identifier 150 is determined for caller 110 or the calling device 120, for example, by using Calling Line Identification (CLID), Calling Number Identification (CNID), Automatic Number Identification (ANI), a Line Identification Database (LID), or any suitable method for providing an identification of the caller 110 or the calling device 120. Alternatively, the caller 110 may be asked by the communications system 130 to input the caller or calling device identifier 150. The caller or calling device identifier 150 can be used to confirm the calling device 120 is capable of interacting by the alternate communication method, for example, by accessing an external network database 160. In some embodiments, the communication system 130 may query the calling device 120 directly to determine the capabilities of the calling device 120. Once a caller or calling device identifier 150 is known, or the capabilities of the calling device 120 have been determined, an initial communication may be sent to the calling device 120. All replies and subsequent communication interaction may be between the calling device 120 and the Messaging System 170 of the agent 180.

Figure 2:
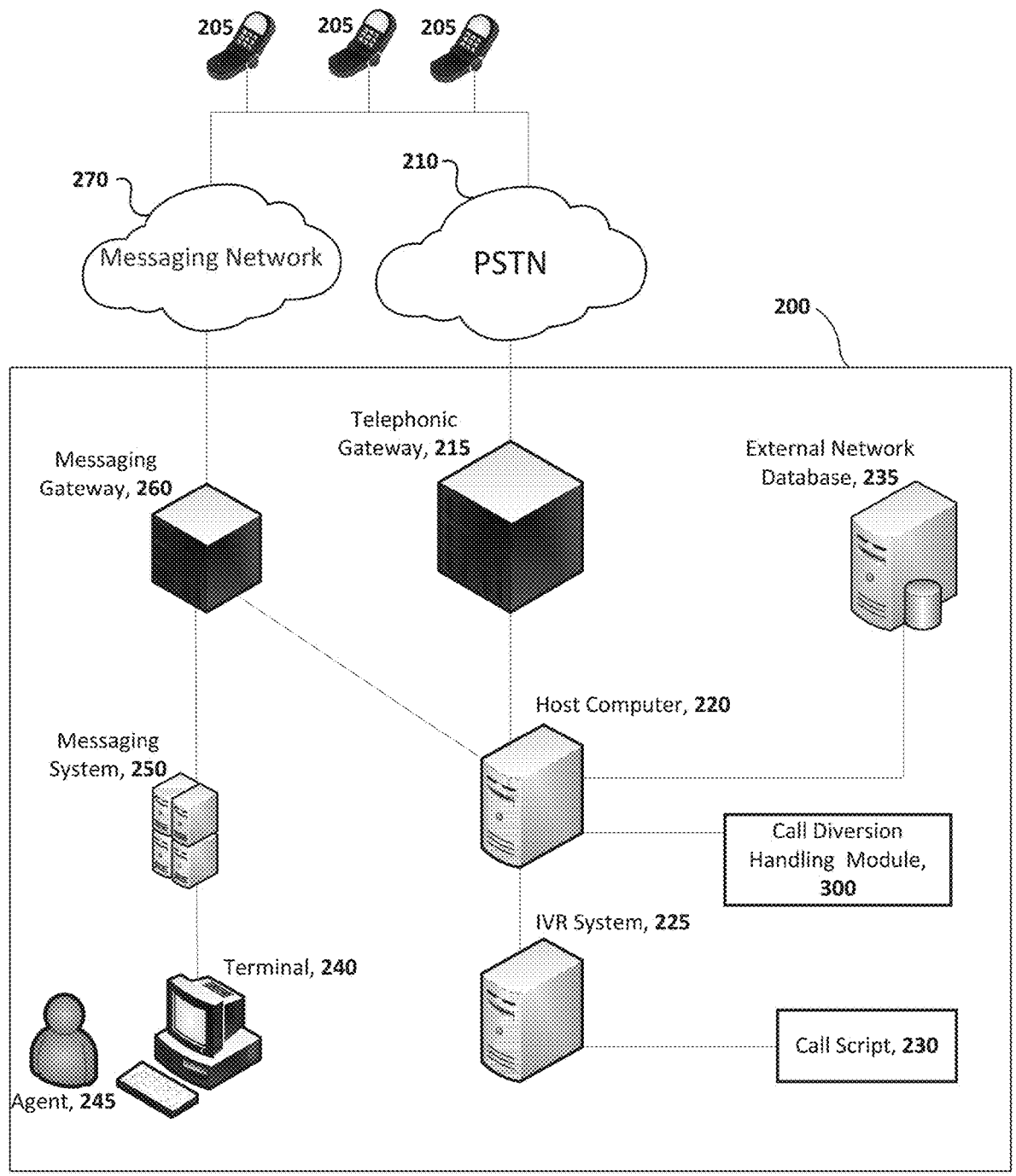
FIG. 2 shows a schematic illustration of an exemplary system configured for call diversion handling according to the disclosed embodiments.

In further illustration, FIG. 2 schematically shows an exemplary contact center data processing system 200 configured for call diversion handling. The system may include a host computer 220 (or multiple host computers) communicatively coupled to different calling devices 205, for example cellphones or softphones over a PSTN 210 by way of a telephonic gateway 215. The host computer 220 can support the execution of an IVR system 225 which may include conducting a request/response session with different callers at the different calling devices 205 utilizing call a flow defined within a call script 230 such as a Voice Extensible Markup Language (VXML) defined call script.

A call diversion handling module 300 can be coupled to the host computer 220. The call diversion handling module 300 can include program code or non-transitory machine readable instructions executable by a processor configured to enable the call diversion handling module 300 to perform the call diversion between the caller at an associated one of the calling devices 205 and IVR system 225. The program code can further be configured to, when executed, enable the call diversion handling module 300 to check that the calling device 205 is capable of interacting by using an External Network Database 235 or by querying the calling device 205 directly. Yet further, the program code can further be configured to, when executed, enable the call diversion handling module 300 to initiate an initial message to the caller via the Message Gateway 260.

Figure 3:
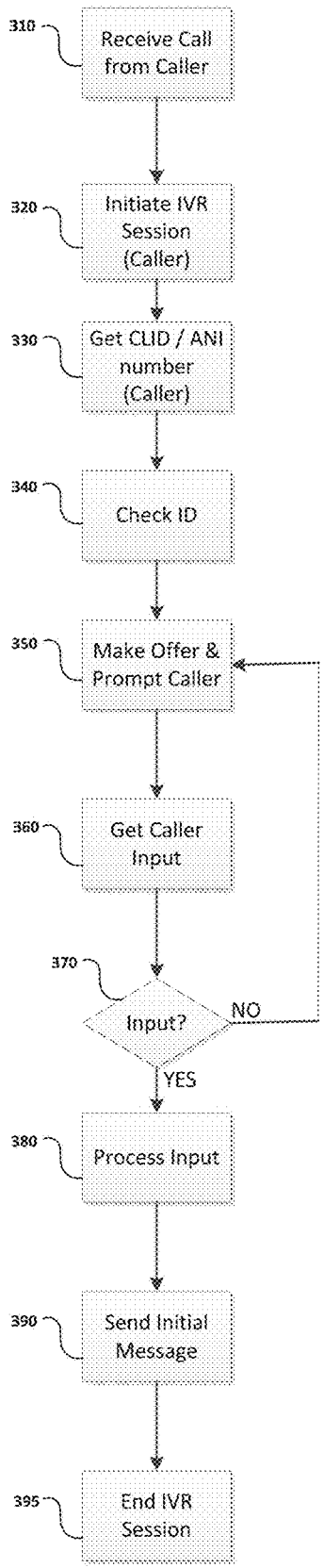
FIG. 3 shows a flow chart illustrating an exemplary process for call diversion according to the disclosed embodiments.

In yet a further illustration of the operations of the call diversion handling module 300, FIG. 3 is a flow chart illustrating a process for call diversion handling in a contact center, for example the data processing system 200 in FIG. 2. Beginning in block 310, a call can be received by the communication system 200 from a caller using an exemplary calling device 205. In block 320 the call is answered. A caller or calling device unique identifier such as the caller's telephone number (aka CLID/ANI) is automatically obtained in block 330 if it is available. If the unique identifier is available, in block 340 a call to the External Network Database 235 is effected to check if the calling device is capable of an alternate communication method, for example, a messaging technique. In some embodiments, the communication system 200 may query the calling device 205 directly to determine the capabilities of the calling device 205. At this stage an IVR session may be initiated, for example, by IVR system 225, and the caller is prompted according to a call flow defined for the IVR session (such as that defined by way of a VMXL compliant document), and included in this prompt 350 is an offer of a call diversion to an alternate communication path or technique, for example, a messaging channel. The caller's input 360 is then requested to confirm acceptance of the offer. If the caller or calling device unique identifier has not been obtained at block 330 the caller is further prompted for the unique identifier that may enable addressing of the initial message to the calling device. If no input 360 is received decision 370 is made to return the caller to the prompt 360 where they are again prompted 350 and make the offer. This may be repeated as long as the user remains on hold with the voice call unanswered. If the input 370 is made then the response is processed 380 and using the unique identifier obtained from the caller, an initial message 390 is sent to the caller or calling device using the alternate communication path or technique. At this point the call diversion handling process is complete and the IVR session 395 may be terminated.

Figure 4:
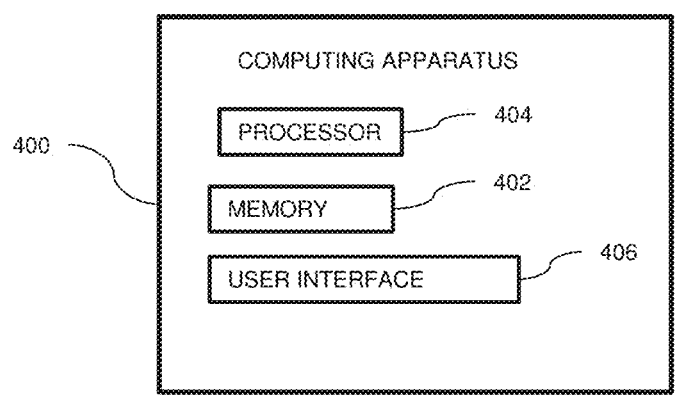
FIG. 4 shows a block diagram of an exemplary computing apparatus that may be used to practice aspects of the disclosed embodiment.

In at least one aspect of the disclosed embodiments, the systems and methods disclosed herein may be executed by one or more computers under the control of one or more programs stored on computer readable medium, such as a non-transitory computer readable medium. FIG. 4 shows a block diagram of an exemplary computing apparatus 400 that may be used to practice aspects of the disclosed embodiment. In at least one exemplary aspect, the calling devices 120, 205, IVR systems 130, 225, external network databases 160, 235, messaging systems 170, 250, telephonic gateway 215, host computer 220, terminal 240, messaging gateway 260, call diversion handling module 300, and other disclosed devices and systems may be implemented using an instance or replica of the computing apparatus 400 or may be combined or distributed among any number of instances or replicas of computing apparatus 400.

The computing apparatus 400 may include computer readable program code or machine readable executable instructions stored on at least one computer readable medium 402, which when executed, are configured to carry out and execute the processes and methods described herein. The computer readable medium 402 may be a memory of the computing apparatus 400. In alternate aspects, the computer readable program code may be stored in a memory external to, or remote from, the apparatus 400. The memory may include magnetic media, semiconductor media, optical media, or any media which may be readable and executable by a computer. Computing apparatus 400 may also include a processor 404 for executing the computer readable program code stored on the at least one computer readable medium 402. In at least one aspect, computing apparatus may include one or more input or output devices, generally referred to as a user interface 406, for example, the user interface (UI) described above, which may operate to allow input to the computing apparatus 1000 or to provide output from the computing apparatus 400, respectively. The user interface 406 may include a device display, touch screen, buttons, and audio input and output.

It is contemplated that when using the alternate communication method, an agent may be capable of servicing multiple callers at the same time and that call waiting time may be reduced.

It should be understood that the disclosed embodiments may take the form of an entirely hardware embodiment, an entirely software embodiment or an embodiment containing both hardware and software elements.

While the techniques and systems disclosed herein are described in the context of initiating communications over the Public Switched Telephone Network (PSTN), it should be understood that any suitable communication network may be used for initiating communications.

While the techniques and systems disclosed herein are described in the context of an IVR system, it should be understood that any system suitable for performing the described functions and operations may be used to implement the disclosed embodiments. Furthermore, while text messaging is used an exemplary alternate communication mechanism, it should be understood that any communication technique or arrangement may be used as the alternate communication mechanism.

In at least one aspect, the disclosed embodiments are directed to placing a call in a queue, providing call handling selections including an alternate communication method, upon selection of the alternate communication method, obtaining a device identifier, and using the device identifier to effect the alternate communication method.

The invention claimed is:

1. A method of voice call diversion, comprising:
   detecting an incoming voice call communication from a calling device of a caller to a communication system associated with an agent;
   identifying the agent is not immediately available for voice dialogue with the caller;
   directly querying the calling device from the communication system;
   identifying an alternate communication option capability of the calling device, present on the calling device, based on a result of the direct query;
   offering the alternate communication option to the calling device as a prompt from the communication system;
   detecting a selection of the alternate communication option from the calling device; and,
   diverting the incoming voice call communication so as to utilize the selected alternate communication option instead of the voice call communication to facilitate a dialogue between the caller and the agent,
   wherein the alternate communication option is identified without an identifier presented by the calling device to the communication system,
   wherein the communication system does not have any information concerning the calling device prior to the incoming voice call communication, and
   wherein the calling device is directly queried and the alternate communication option is identified after the incoming voice call is detected and before the incoming voice call is diverted.

2. The method of claim 1, wherein detecting the incoming voice call communication comprises placing the incoming voice call communication in a queue.

3. The method of claim 1, wherein identifying the alternate communication option comprises identifying one or more non-voice communication options.

4. The method of claim 3, wherein offering the alternate communication option to the calling device comprises sending a notification to the calling device of the one or more non-voice communication options.

5. The method of claim 4, wherein detecting a selection of the alternate communication option comprises detecting a selection from the one or more non-voice communication options.

6. The method of claim 1, wherein diverting the incoming voice call so as to utilize the selected alternate communication option comprises converting a communication format of the incoming voice call communication to a format of the selected alternate communication option.

7. The method of claim 6, wherein the alternate communication option is a text message communication option.

8. The method of claim 1, wherein the communication system is in a business or contact center system.

9. The method of claim 1, wherein the communication system comprises an interactive voice system (IVR).

10. The method of claim 9, wherein the method further comprises the step of:
    conducting a request/response session with different callers utilizing different calling devices via the IVR.

11. The method of claim 1, wherein the communication system comprises a call diversion handling module.

12. The method of claim 1, further comprising:
    confirming that the calling device is capable of interacting with the alternate communication option based on a caller identifier.

13. The method of claim 1, further comprising:
    confirming that the calling device is capable of interacting with the alternate communication option based on a calling device identifier.

14. The method of claim 1, wherein the call diversion handling module is further configured to:
    confirm that the calling device is capable of interacting with the alternate communication option based on a caller identifier.

15. The method of claim 1, wherein the call diversion handling module is further configured to:
    confirm that the calling device is capable of interacting with the alternate communication option based on a calling device identifier.

16. The method of claim 1, further comprising a step of:
    accessing an external network database by the communication system,
    wherein the identifying the alternate communication option capability of the calling device is further based on accessing the external network database.

17. The method of call diversion of claim 1, wherein the diverting of the incoming voice call communication facilitates a dialogue between the caller and a second agent using the alternate communication option.

18. A system for voice call diversion, comprising:
a communication system associated with an agent; and
a call diversion handling module comprising at least one processor and memory configured to:
   detect an incoming voice call communication from a calling device of a caller to the communication system;
   identify the agent is not immediately available for voice dialogue with the caller;
   directly query the calling device;
   identify an alternate communication option capability of the calling device, present on the calling device, based on a result of the direct query;
   offer the alternate communication option to the calling device as a prompt from the communication system;
   detect a selection of the alternate communication option from the calling device; and,
   divert the incoming voice call communication so as to utilize the selected alternate communication option instead of the voice call communication to facilitate a dialogue between the caller and the agent,
   wherein the alternate communication option is identified without an identifier presented by the calling device to the communication system,
   wherein the communication system does not have any information concerning the calling device prior to the incoming voice call communication, and
   wherein the calling device is directly queried and the alternate communication option is identified after the incoming voice call is detected and before the incoming voice call is diverted.

19. The system of claim 18, wherein upon detecting the incoming voice call communication, the system is configured to place the incoming voice call communication in a queue.

20. The system of claim 18, wherein the call diversion handling module is configured to identify one or more alternate non-voice communication options.

21. The system of claim 20, wherein the call diversion handling module is configured to offer the alternate communication option to the calling device by sending a notification to the calling device of the one or more non-voice communication options.

22. The system of claim 21, wherein the call diversion handling module is configured to detect a selection from the one or more alternate non-voice communication options.

23. The system of claim 18, wherein the call diversion handling module is configured to divert the incoming voice call so as to utilize the selected alternate communication option by converting a communication format of the incoming voice call communication to a format of the selected alternate communication option.

24. The system of claim 23, wherein the alternate communication option is a text message communication option.

25. A computer program product comprising non-transitory computer program instructions that when executed by a processor cause the processor to perform the method according to claim 1.

26. The system of claim 18, wherein the communication system is in a business or contact center system.

27. The system of claim 18, wherein the communication system comprises an interactive voice system (IVR).

28. The system of claim 27, wherein the system is arranged to conduct a request/response session with different callers utilizing different calling devices via the IVR.

29. The system of claim 18, wherein the communication system comprises the call diversion handling module.

30. The system for voice call diversion of claim 18, wherein the call diversion handling module is further configured to access an external network database, and the identifying the alternate communication option capability of the calling device is further based on accessing the external network database.

31. The system for voice call diversion of claim 18, wherein the diverting of the incoming voice call communication facilitates a dialogue between the caller and a second agent using the alternate communication option.

32. A call diversion handling module comprising at least one processor and memory configured to:
   detect an incoming voice call communication from a calling device of a caller to a communication system associated with an agent;
   identify the agent is not immediately available for voice dialogue with the caller;
   directly query the calling device;
   identify an alternate communication option capability of the calling device, present on the calling device, based on a result of the direct query;
   offer the alternate communication option to the calling device as a prompt from the communication system;
   detect a selection of the alternate communication option from the calling device; and,
   divert the incoming voice call communication so as to utilize the selected alternate communication option instead of the voice call communication to facilitate a dialogue between the caller and the agent,
   wherein the alternate communication option is identified without an identifier presented by the calling device to the communication system,
   wherein the communication system does not have any information concerning the calling device prior to the incoming voice call communication, and
   wherein the calling device is directly queried and the alternate communication option is identified after the incoming voice call is detected and before the incoming voice call is diverted.

33. The call diversion handling module of claim 32, wherein upon detecting the incoming voice call communication, the call diversion handling module is configured to place the incoming voice call communication in a queue.

34. The call diversion handling module of claim 32, wherein the call diversion module is configured to identify one or more alternate non-voice communication options.

35. The call diversion handling module of claim 34, wherein the call diversion module is configured to offer the alternate communication option to the calling device by sending a notification to the calling device of the one or more non-voice communication options.

36. The call diversion handling module of claim 35, wherein the call diversion module is configured to detect a selection from the one or more alternate non-voice communication options.

37. The call diversion handling module of claim 32, wherein the communication diversion module is configured to divert the incoming voice call so as to utilize the selected alternate communication option by converting a communication format of the incoming voice call communication to a format of the selected alternate communication option.

38. The call diversion handling module of claim 37, wherein the alternate communication option is a text message communication option.

39. The call diversion handling module of claim 32, wherein the call diversion handling module is further configured to access an external network database, and the identifying an alternate communication option capability of the calling device is further based on accessing the external network database.

40. The call diversion handling module of claim 32, wherein the diverting of the incoming voice call communication facilitates a dialogue between the caller and a second agent using the alternate communication option.

* * * * *